United States Patent [19]
Morgan et al.

[11] Patent Number: 6,079,144
[45] Date of Patent: Jun. 27, 2000

[54] MOTION ACTUATED LIGHT

[76] Inventors: Thomas Scott Morgan, 553 Country Rd. 62, Heflin, Ala. 36264-5538; Mark Anthony Connell, P.O. Box 54, Edwardsville, Ala. 36261-0054

[21] Appl. No.: 09/129,023

[22] Filed: Aug. 4, 1998

[51] Int. Cl.⁷ .......................... A01K 75/02; A01K 85/00
[52] U.S. Cl. ............................................. 43/17.6; 43/17.5
[58] Field of Search .................................. 43/17.5, 17.6, 43/17

[56] References Cited

U.S. PATENT DOCUMENTS

| | | | |
|---|---|---|---|
| 2,128,899 | 9/1938 | Barnhart | 43/17 |
| 2,205,352 | 6/1940 | Fisher | 43/17 |
| 2,217,565 | 10/1940 | Siegle et al. | 43/17 |
| 2,252,358 | 8/1941 | Tosi | 43/17 |
| 2,448,681 | 9/1948 | Nutter | 43/17 |
| 2,517,479 | 8/1950 | Grimm et al. | 43/17 |
| 2,542,132 | 2/1951 | Goertzen | 43/17 |
| 2,897,623 | 8/1959 | Flournoy | 43/17.6 |
| 2,947,105 | 8/1960 | Lagios | 43/17 |
| 3,535,812 | 10/1970 | Crecelius | 43/17.6 |
| 3,828,177 | 8/1974 | Day | 240/6.4 F |
| 3,863,380 | 2/1975 | Purlia | 43/17.6 |
| 3,882,629 | 5/1975 | Kaye | 43/17 |
| 4,157,627 | 6/1979 | Tschelisnik | 43/17 |
| 4,175,348 | 11/1979 | Ray | 43/17.6 |
| 4,250,650 | 2/1981 | Fima | 43/17.6 |
| 4,467,154 | 8/1984 | Hill | 200/61.45 R |
| 4,479,321 | 10/1984 | Welstead | 43/17 |
| 4,486,969 | 12/1984 | Swenson | 43/17 |
| 4,513,183 | 4/1985 | Hill | 200/61.45 R |
| 4,625,446 | 12/1986 | Morimoto | 43/17.6 |
| 4,638,584 | 1/1987 | Lindsay | 43/17.6 |
| 4,658,531 | 4/1987 | Morimoto | 43/17 |
| 4,748,761 | 6/1988 | Machhovina | 43/17 |
| 4,757,632 | 7/1988 | Grobl | 43/17.6 |
| 4,799,327 | 1/1989 | Treon | 43/17.6 |
| 4,807,383 | 2/1989 | Delwiche | 43/17.5 |
| 4,884,355 | 12/1989 | Neihoff et al. | 43/17 |
| 4,888,905 | 12/1989 | Garr | 43/17.6 |
| 5,036,615 | 8/1991 | Lu | 43/17 |
| 5,076,003 | 12/1991 | Chen | 43/17.5 |
| 5,195,266 | 3/1993 | Troescher | 43/17.6 |
| 5,299,107 | 3/1994 | Ratcliffe et al. | 362/158 |
| 5,351,431 | 10/1994 | Ryu | 43/17 |
| 5,495,690 | 3/1996 | Hunt | 43/17.6 |
| 5,615,512 | 4/1997 | Wang | 43/17.5 |

FOREIGN PATENT DOCUMENTS

| | | | |
|---|---|---|---|
| 1441640 | 5/1966 | France | 43/17.6 |
| 640967 | 6/1962 | Italy | 43/17.6 |
| 1-108931 | 4/1989 | Japan | 43/17.6 |
| 1200511 | 7/1970 | United Kingdom | 43/17.6 |
| WO 84/02446 | 7/1984 | WIPO | 43/17.5 |

OTHER PUBLICATIONS

Field & Stream, "New Fish Catching Discovery Illegal in 6 States" Paul Stag, p. 13, Advertisement, Aug. 1961.

*Primary Examiner*—Michael J. Carone
*Assistant Examiner*—Fredrick T. French, III
*Attorney, Agent, or Firm*—Robert J. Veal; Kenneth M. Bush; Veal & Bush, LLC

[57] ABSTRACT

An illuminator for a fishing lure utilizes a non-conductive tube in which a pair of electrical contacts are disposed in one end in spaced apart relation and in which a rod having a tapered end is slidably retained. When the tube is horizontally disposed or when the tube is vertically disposed with the contacts in the superior position, the rod does not make contact with both contacts; however, when the tube tends toward the vertical position with the contacts in the lower position, the rod tapered end engages both contacts simultaneously. A small light emitting diode and small battery complete the circuit such that the diode acts as an illuminator while the tapered end is engaged with the contacts.

4 Claims, 3 Drawing Sheets

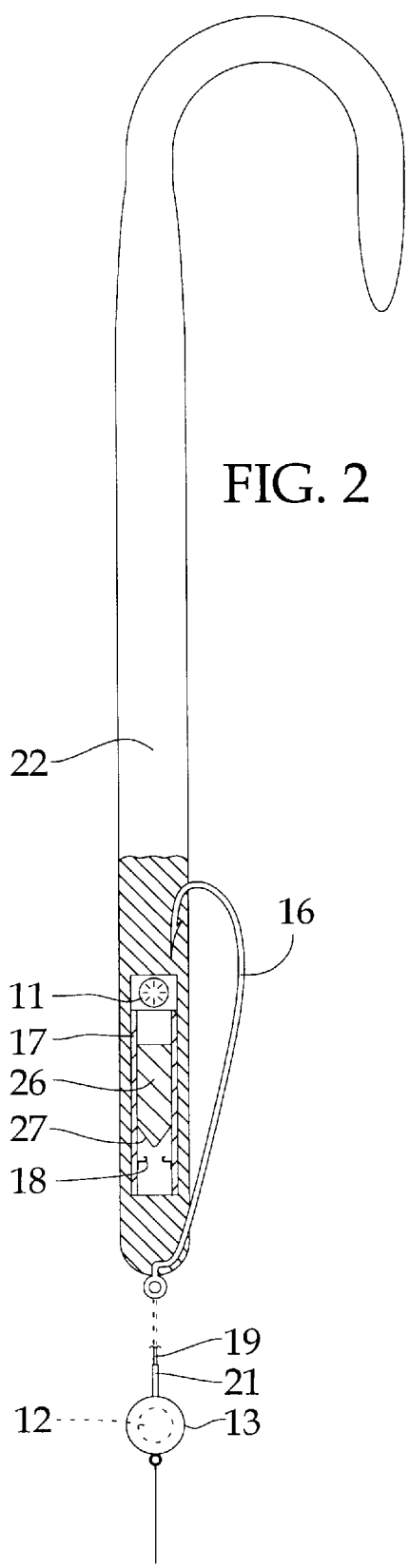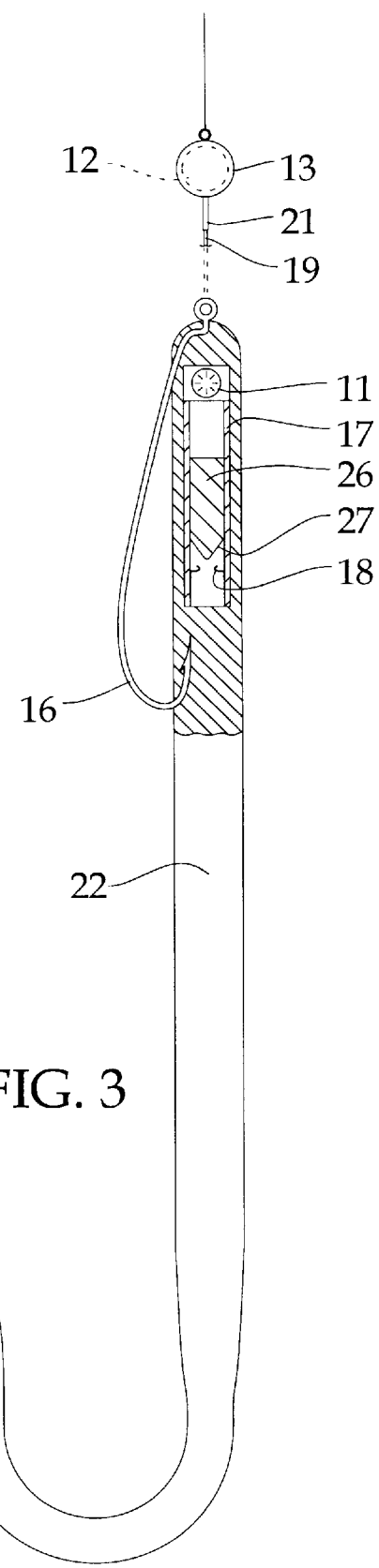

MOTION ACTUATED LIGHT

FIELD OF THE INVENTION

The present invention relates to fishing lures and in greater particularity is most closely related to fishing lures which have soft plastic bodies or internal cavities within which an illuminating means may be disposed. In even greater particularity, the present invention relates to an illuminating means for use with such lures. In still further particularity, the present invention is a gravity actuated switch and light for disposition within the body of a lure such that the light will be intermittently actuated responsive to the movement of the lure as it is retrieved.

BACKGROUND OF THE INVENTION

Gravity actuated switches are well known, particularly the well known mercury switch as illustrated in the following U.S. Pat. Nos. 2,205,352; 3,882,629; 4,479,321; and, 4,486,969. Each of the foregoing patents was directed to the use of a mercury switch as a part of a signaling device for fishermen to indicate when a fish had taken the bait. As is well known mercury contamination is of greater concern with respect to the environment today than it was in years gone by; thus, the use of mercury in a recreational device such as a fishing lure wherein the containment of the mercury will almost certainly be subject to eventual degradation is not feasible. The use of motion sensitive switches in fishing floats is further illustrated in the following U.S. Pat. Nos. 2,448,681; 4,157,627; and, 5,615,512. Each of the foregoing patents was directed to the use of a roller ball switch as part of a signaling device for fishermen to indicate when a strike occurred. Likewise, U.S. Pat. No. 4,748,761 and U.S. Pat. No. 4,884,355 show rod-like members which are movable either by gravity or against spring tension to indicate when a strike has occurred. All of the foregoing are used as signaling devices to indicate to the fisherman that a strike has occurred; thus, it is the action of the fish which actuates the light and elicits a response from the fisherman. The present invention is intended to reverse the actuation and response rolls. To this end, the illuminator is to evoke a response from the fish. A device intended for use as an illuminated fishing lure is shown in U.S. Pat. No. 5,195,266. However, this patent expired for failure to pay the first maintenance fee; thus, it is clear that a constant illumination lure of the type taught therein is not viable. Accordingly, a continuing need exists for a means for illuminating a lure which will entice a fish to strike.

SUMMARY OF THE INVENTION

It is an object of the present invention to provide a fish enticing illumination to a lure such that a fisherman will be able to catch more fish.

Another object of the invention is to provide an illumination source for a lure that will provide illumination in response to motion in the lure actuated by the fisherman such that the coincidence of the illumination and motion provides multiple stimulation to the fish.

Another object of the invention is to provide an illumination source which does not pose a significant environmental hazard.

These and other objects and features of the invention are accomplished by the novel use of a mechanical gravity actuated switch which can be sized to fit within a soft bodied fishing lure such as a worm or grub. As is well known, such worms and grubs are typically about the same diameter or smaller than a common lead pencil; therefore, a premium is placed on the size of the illuminator to be used. The small size has been found to be of particular concern in that the ball in a ball type gravity switch in this application does not have sufficient size or mass to effectively and repeatedly make and break contact to give the desired intermittent signal. As is well known, these type switches have relatively high conductive losses; thus, the small size of ball elements necessary have not been amenable to this invention. Accordingly, the present invention utilizes an elongated rod of sufficient mass to insure positive contact. Specifically, the present invention utilizes a non-conductive tube in which a pair of electrical contacts are disposed in one end in spaced apart relation and in which a rod having a tapered end is slidably retained. When the tube is horizontally disposed or when the tube is vertically disposed with the contacts in the superior position, the rod does not make contact with both contacts; however, when the tube tends toward the vertical position with the contacts in the lower position, the rod tapered end engages both contacts simultaneously. A small light emitting diode and small battery complete the circuit such that the diode acts as an illuminator while the tapered end is engaged with the contacts.

BRIEF DESCRIPTION OF THE DRAWINGS

Apparatus embodying the features of my invention are depicted in the accompanying drawings, which form a portion of this disclosure and wherein:

FIG. 2 is a sectional view of the illuminator in a soft body lure; and,

FIG. 3 is a sectional view of an alternative embodiment.

DESCRIPTION OF THE PREFERRED EMBODIMENT

Figure 1:
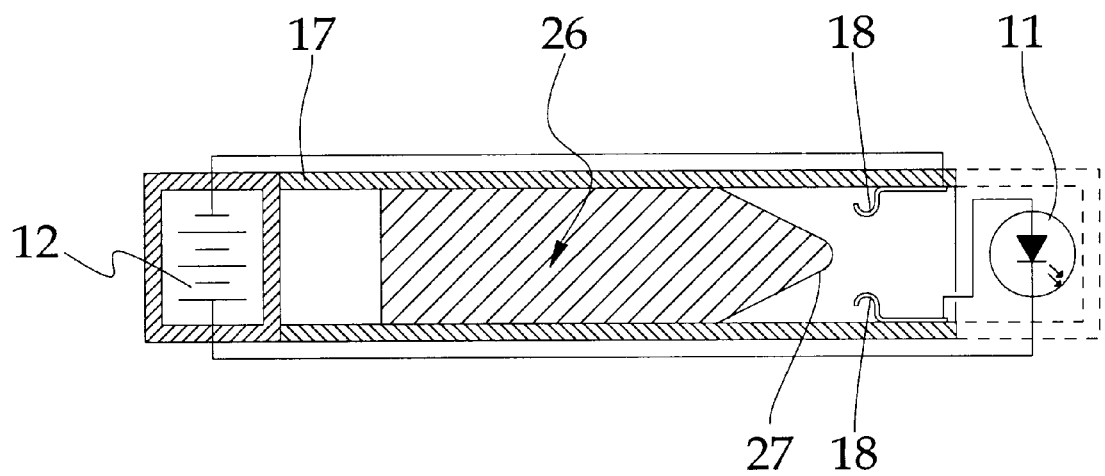
FIG. 1 is an elevational view partially in section of the illuminator.
Figure 4:
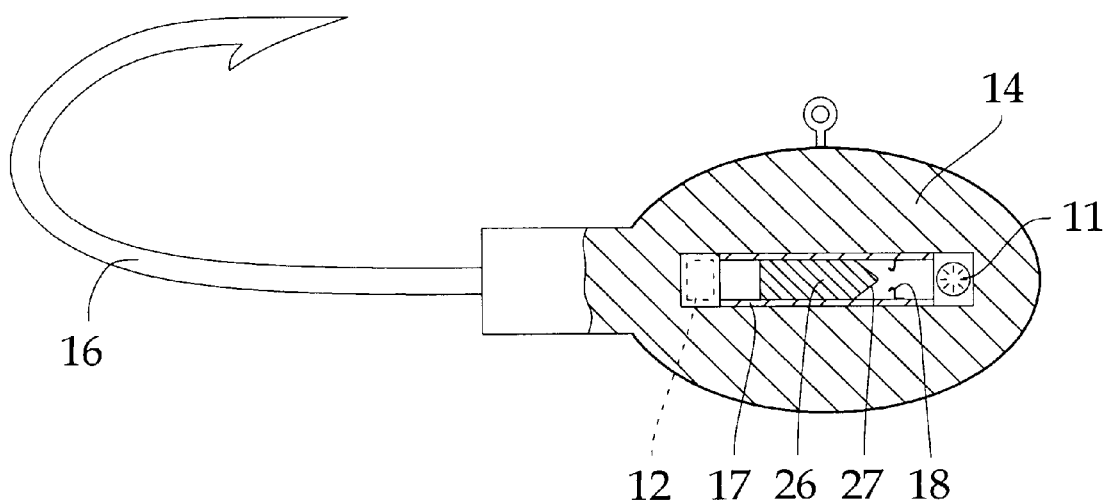
FIG. 4 is a sectional view of another embodiment.

Referring to the drawings for a clearer understanding of the invention it will be appreciated that in FIG. 1, we have shown the invention in a first form. To serve as an illuminator, the present invention utilizes a light emitting diode (LED) 11. Such devices are well known and their specific operation is not discussed herein. Although the specific color of the light emitted may be varied, the color is immaterial except to the extent that certain colors may be attenuated by the specific use as hereinafter described. For LED 11 to emit light it must be connected in an electrical circuit including a power source or battery 12. Battery 12 should be selected from the array of miniature batteries available on the market today such that it has a sufficient voltage and power rating to provide the electrical energy needed to illuminate LED 11 and has a size suitable for the present requirements. Battery 12 may in some cases be incorporated into or formed with a weight 13, as in FIG. 2 similar to those commonly used with soft plastic lures in a variety of weights and shapes. Additionally, the battery may be formed with or affixed to a weighted jig head 14, as in FIG. 3, wherein the weight 13 is affixed to a hook 16 such that the head can be tied to a fishing line. LED 11 is preferably affixed to a non-conductive tube 17 which can be sealed against moisture. Tube 17 has mounted within it a pair of spaced apart electrical contacts 18, which are positioned at one end of Tube 17 and are connected in series by a conductor 19 with battery 12 and LED 11. Preferably, LED 1 1 is of size compatible with tube 17 such that LED 11 may be affixed to one end of tube 17. Battery 12 may be affixed directly to tube 17 or may be merely connected by conductor 19 which may be reinforced by an non-conductive line 21. LED 11 and tube 17 are sized to fit within the body of a soft plastic lure 22, such as a grub or worm as shown in FIG. 2 or FIG. 3; however, the present invention is usable with other lures within which tube 17 may be positioned. Tube 17 confines a rod 26 which is slidably positionable depending on the orientation of tube 17. One end 27 of rod 26 is tapered such that a portion of the tapered end will pass between contacts 18 when tube 17 is vertically oriented with the contacts on the lower end of the tube. True vertical orientation is not necessary as long as the tapered end is adequately engaged with contacts 18.

To use the invention with a soft plastic lure 22, tube 17 is inserted into the body of the lure substantially along the longitudinal axis of lure and preferably near hook 16. For example, in FIG. 2 the lure is "Texas-rigged" and the tube is inserted between the head eyelet of the hook and the barb which is embedded in the soft plastic lure. Battery 12 is affixed weight 13 externally of the lure and connected to the illuminator by conductors 19. In this configuration, it will be noted that contacts 18 are in the end of the tube proximal the weight and LED 11 is positioned at the end proximal the barb of hook 16. A fishing line is connected to the eyelet of hook 16; thus, as the lure is retrieved by the line the motion of the lure can be controlled. A typical retrieve of a soft plastic worm uses a stop and go action wherein the lure is briefly lifted and then allowed to drop as the line is intermittently shortened. In such retrieval action, the weighted end of the lure leads the action, either rising first when the line lifts the lure or falling first as the lure is allowed to drop. Many fishermen believe that fish tend to strike during the drop portion of the retrieve; therefore, the orientation of FIG. 2 places tube 17 in a somewhat vertical position with the contacts lowermost during the drop thereby actuating LED 11 during the portion of the retrieve when the fish is most likely to hit.

Contrawise, the orientation in FIG. 3 has the contacts at the end of tube 17 distal the weighted end; thus, rod 26 will fall into engagement with contacts 18 when the weighted end is lifted by the fisherman pulling on the line and LED 11 will be illuminated on the rise portion of the retrieve.

Accordingly, the fisherman can augment and enhance the performance characteristics of his lures in a manner that best suits his style of fishing and lure presentation.

While I have shown the invention in various forms it is to be understood that it is susceptible to such variation as is encompassed within the scope of the appended claims.

What we claim is:

1. A fishing lure, comprising:
   an elongated, waterproof compartment having first and second ends;
   a pair of spaced electrical contacts mounted at said first end of said compartment, wherein said contacts are connected in series to a light-emitting element and a remote electrical power source located external said lure;
   wherein said remote power source is designed for attachment to a fishing line and is connected to said contacts by a conductive wire, said power source and said conductive wire being enclosed in a non-conductive material; and
   a conductive element slidably positioned within said compartment for longitudinal movement between said first and second ends, wherein said conductive element is operative to simultaneously engage said contacts in response to a predetermined orientation of said lure such that the circuit between said contacts is closed by said conductive element and said light-emitting element is energized by said power source to emit light.

2. A fishing lure according to claim 1 wherein said electrical power source comprises a battery.

3. A fishing lure according to claim 1 wherein said light-emitting element comprises a light-emitting diode.

4. A fishing lure according to claim 1 wherein said conductive element is a rod having a tapered end such that said tapered end is received between said contacts when said lure is oriented into said predetermined orientation.

* * * * *